(12) United States Patent
Plastina et al.

(10) Patent No.: US 8,099,459 B2
(45) Date of Patent: Jan. 17, 2012

(54) CONTENT FEEDBACK FOR AUTHORS OF WEB SYNDICATIONS

(75) Inventors: Daniel Plastina, Sammamish, WA (US); Andrew J. Jaffray, Seattle, WA (US); Andrew L. Silverman, Redmond, WA (US); John P. Mullally, IV, Seattle, WA (US); Joshuah Vincent, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 761 days.

(21) Appl. No.: 11/426,031

(22) Filed: Jun. 23, 2006

(65) Prior Publication Data

US 2007/0299935 A1 Dec. 27, 2007

(51) Int. Cl.
*G06F 15/16* (2006.01)

(52) U.S. Cl. ......... 709/204; 709/205; 709/206; 709/219

(58) Field of Classification Search .................... 709/204
See application file for complete search history.

(56) References Cited

U.S. PATENT DOCUMENTS

| | | | |
|---|---|---|---|
| 6,389,467 B1 | 5/2002 | Eyal | |
| 6,401,211 B1 | 6/2002 | Brezak, Jr. et al. | |
| 6,404,441 B1 | 6/2002 | Chailleux | |
| 6,560,651 B2 | 5/2003 | Katz et al. | |
| 6,738,078 B1 | 5/2004 | Duncombe | |
| 6,792,573 B1 | 9/2004 | Duncombe | |
| 6,931,528 B1 | 8/2005 | Immonen | |
| 7,505,974 B2 * | 3/2009 | Gropper | 1/1 |
| 7,523,191 B1 * | 4/2009 | Thomas et al. | 709/224 |
| 2001/0025259 A1 | 9/2001 | Rouchon | |
| 2002/0056102 A1 | 5/2002 | Dillon et al. | |
| 2002/0095454 A1 * | 7/2002 | Reed et al. | 709/201 |
| 2002/0120564 A1 | 8/2002 | Strietzel | |
| 2003/0036948 A1 | 2/2003 | Woodward et al. | |
| 2003/0093793 A1 | 5/2003 | Gutta | |
| 2003/0105870 A1 | 6/2003 | Baum | |
| 2003/0236695 A1 | 12/2003 | Litwin, Jr. | |
| 2003/0236886 A1 * | 12/2003 | Oren et al. | 709/225 |
| 2004/0002993 A1 | 1/2004 | Toussaint et al. | |

(Continued)

FOREIGN PATENT DOCUMENTS

WO 2004060509 A2 7/2004

(Continued)

OTHER PUBLICATIONS

Salkie, Phil, Internet Radio to Podcast with Shell Tools, Linux Journal, Sep. 2005, 9 pages, http://sw.deri.org/juan/weblog/podcast.pdf, vol. 2005, Issue 137, Specialized Systems Consultants, Inc., USA.

(Continued)

*Primary Examiner* — Jeffrey Pwu
*Assistant Examiner* — Shaq Taha
(74) *Attorney, Agent, or Firm* — Senniger Powers LLP

(57) ABSTRACT

Transmit user feedback from a user to a web syndication author. A first communication link is opened. Content data from the web syndication author is received. The received content data is stored on a first client device. The opened first communication link is terminated after receiving the content data. User behavior data is collected as a function of user interactions with the received content data on the first client device after terminating the first communication link. User feedback including the collected user behavior data is transmitted to the web syndication author by opening a second communication link.

17 Claims, 8 Drawing Sheets

U.S. PATENT DOCUMENTS

| | | | |
|---|---|---|---|
| 2004/0107356 A1 | 6/2004 | Shamoon et al. | |
| 2005/0019015 A1 | 1/2005 | Ackley et al. | |
| 2005/0021744 A1* | 1/2005 | Haitsuka et al. | 709/224 |
| 2005/0022239 A1 | 1/2005 | Meuleman | |
| 2005/0065801 A1 | 3/2005 | Poikselka et al. | |
| 2005/0132401 A1 | 6/2005 | Boccon-Gibod et al. | |
| 2006/0173985 A1 | 8/2006 | Moore | |
| 2006/0265409 A1* | 11/2006 | Neumann et al. | 707/100 |
| 2007/0061393 A1* | 3/2007 | Moore | 709/201 |
| 2007/0078832 A1* | 4/2007 | Ott et al. | 707/3 |
| 2007/0088832 A1* | 4/2007 | Tsang et al. | 709/227 |
| 2007/0094363 A1* | 4/2007 | Yruski et al. | 709/220 |
| 2007/0179835 A1* | 8/2007 | Ott et al. | 705/10 |
| 2007/0198368 A1* | 8/2007 | Kannan et al. | 705/26 |
| 2007/0282850 A1* | 12/2007 | Sachnoff | 707/10 |
| 2008/0270309 A1* | 10/2008 | Brotman et al. | 705/52 |

FOREIGN PATENT DOCUMENTS

| | | |
|---|---|---|
| WO | 2005089336 A2 | 9/2005 |
| WO | 2006/093840 A2 | 9/2006 |

OTHER PUBLICATIONS

Chhatpar, Chandresh, et al., Variability of User Interaction with Multi-Platform News Feeds, 2004, 9 pages, http://eprints.cs.vt.edu/archive/0000069/01/TR04-22-Chhatpar-Lambros.doc.pdf, Computer Science, Virginia Tech, Blacksburg, VA.

Hogan, Aidan et al., "Podcast Pinpointer: A Multimedia Semantic Web Application", 2nd European Workshop on the Integration of Knowledge, Semantic and Digital Media Technologies, London, U.K., Nov. 30 to Dec. 1, 2005, 4 pages, National University of Ireland, Galway, Ireland.

Swierk, Edward, et al., The Roma Personal Metadata Service, Oct. 2001, 16 pages, Stanford University, USA.

S. Gutta et al., "Method and Apparatus for Generating Recommendation Scores Using Implicit and Explicit Viewing Preferences"; U.S. Appl. No. 09/666,401, filed Sep. 20, 2000.

\* cited by examiner

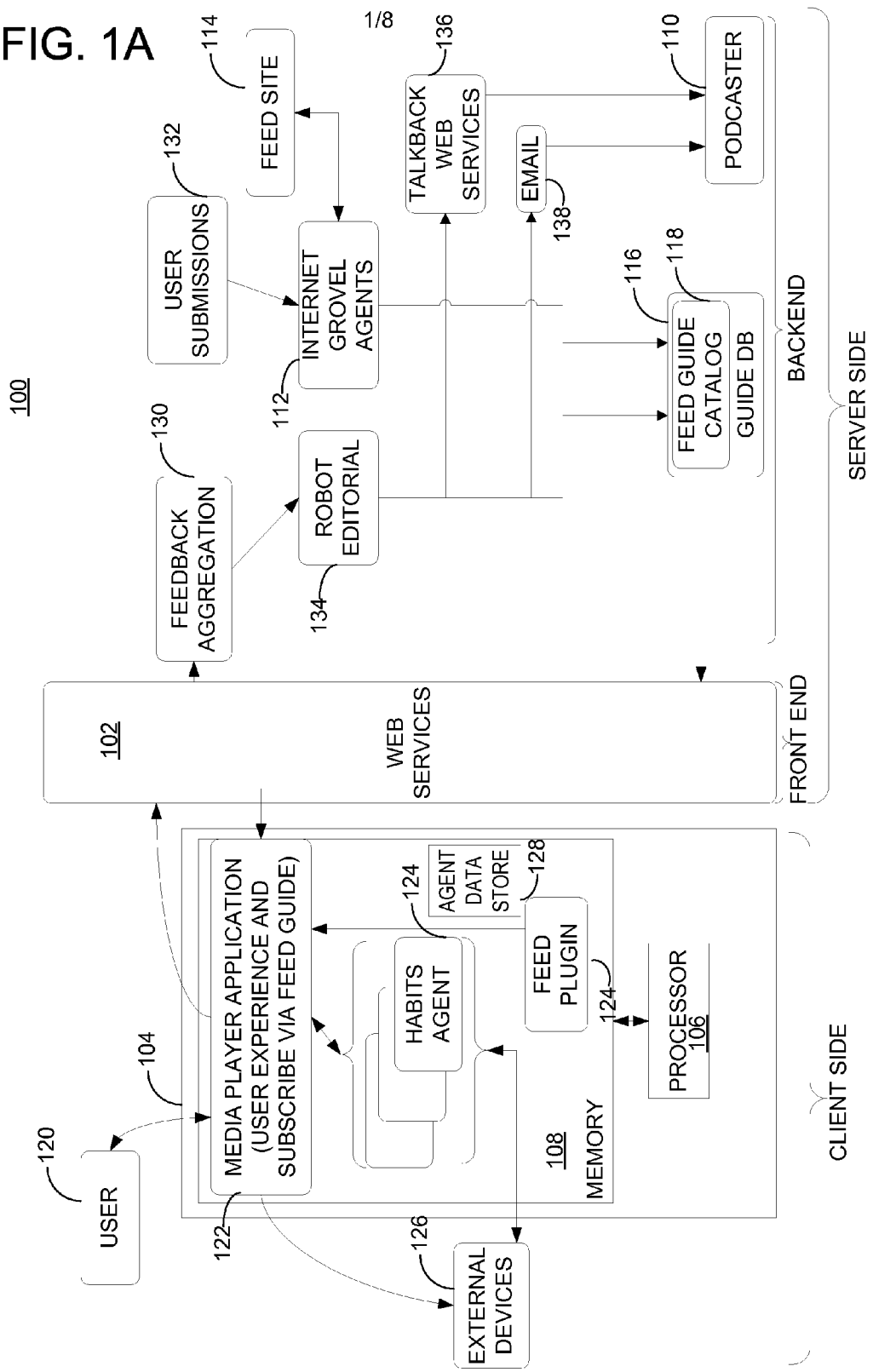

FIG. 2A

PODCASTER FEEDBACK

TITLE: JOE'S WEEKLY PODCAST
PODCASTER: JOE STEVENS
SUBSCRIPTION: JUST SIGNED UP
DATE OF LAST SYNDICATION: 5/20/2006
EPISODE: 21

1. CONTENT APPROPRIATE FOR G-RATED AUDIENCE?

VERY INAPPROPRIATE — VERY APPRORIATE

2. CONTENT AUDIO QUALITY?

EXCELLENT — VERY POOR

3. EDGY/HOP VS. MAINSTREAM?

EDGY/HIP — MAINSTREAM

4. FUN VS. BORING?

FUN — BORING

5. CONTENT DOWNLOAD SPEED?

VERY FAST — LIKE A TURTLE

[SUBMIT TO PODCASTER NOW]  [SUBMIT TO PODCASTER LATER]  [CANCEL]

FIG. 2B

PODCASTER FEEDBACK

TITLE: JOE'S WEEKLY PODCAST
PODCASTER: JOE STEVENS
SUBSCRIPTION: YES
DATE OF LAST SYNDICATION: 5/20/2006
EPISODE: 21

1. CONTENT TYPE?

☑ PROFANE  ☐ EXPLICIT  ☐ LEWD

2. CONTENT VIDEO QUALITY?

○ ○ ● ○ ○ ○ ○ ○

EXCELLENT                VERY POOR

3. SUGGEST KEYWORDS:

4. CLEARLY ARTICULATED VS. MUMBLING?

○ ● ○ ○ ○ ○ ○ ○

CLEARLY ARTICULATED       MUMBLING

5. CONCISE VS. VERBOSE?

○ ○ ○ ○ ○ ● ○ ○

CONCISE                   VERBOSE

| SUBMIT TO PODCASTER NOW | SUBMIT TO PODCASTER LATER | CANCEL |

FIG. 3

WEB SYNDICATION FEEDBACK SETTINGS — 302

1. AUTOMATIC TRANSMITTING FEEDBACK TO PODCASTER?
   - ☑ YES        ☐ NO

DURATION:
   - ☑ 1 WEEK;  ☐ 2 WEEKS;  ☐ 1 MONTH;

2. PROMPT FOR LEAVING FEEDBACK FOR PODCASTER?
   - ☑ YES        ☐ NO

3. TRACKING MEDIA CONTENT USAGE ON EXTERNAL DEVICES?
   - ☑ YES        ☐ NO

4. WHEN TO REMIND ME TO SUBMIT FEEDBACK TO PODCASTER?
   - ☑ 1 WEEK     ☐ 2 WEEKS

[SAVE] — 304        [CANCEL] — 306

US 8,099,459 B2

CONTENT FEEDBACK FOR AUTHORS OF WEB SYNDICATIONS

BACKGROUND

With the convenience of the Internet, online users frequently share information with other users through various protocols used on the Internet. For example, online users are familiar with hypertext pages, or the so-called "web pages" in which individual users and corporate users (e.g., government entities and private organizations) post information available for use. Other methods of sharing or disseminating information include audio or video data streaming from a web site. A new method of transmitting information over the internet is currently known as web syndication, feeds or "podcast" in which media (e.g., audio or video) content is provided to the user through a subscription paradigm.

A typical online feed or web syndication environment includes a publisher or an author (also known as "podcaster") announcing a link to his or her media content offerings to a web audience at an online feed aggregation web site. The web audience would then visit the feed aggregation web site and select desirable online feeds or web syndication content by subscribing to the media content offerings of the web author or adding the link to a feed reader. In another existing environment, a media player application provides an online feed guide, which is an aggregation of online feeds, such that the web syndication is within the media player user experience (i.e., no additional graphical user interface (GUI)). A user would then browse, search, and navigate the online feed guide to subscribe to the media content offerings. Once the user has subscribed to the media content offerings, the user would automatically receive the subscribed content or "episodes" of the content once the feed publisher or author announces additional or subsequent offerings under the same link. Other podcasters may host their own web site and offer online feeds via their own personal web sites.

These existing online feeds environments currently distance the podcasters from their subscribers because the podcasters' interaction with potential audience is limited to the act of offering the feeds to the audience. The audience typically does not have ways to communicate with the podcasters to comment on the feeds. Even where the online feeds are offered through the podcasters' personal web sites, the audience is required to browse through the web site to locate podcaster's contact information, if provided, before providing comments or provide feedback to the podcasters.

In particular, the current environment and model does not provide the podcasters with at least one of the following useful information: (1) if a user files a complaint on the feed due to profanity, sexually explicit, or other content; (2) if a user suggested alternate keywords, categories, etc.; (3) how often their feed was returned as a search result; (4) reasons why the feed was not included in the aggregated feed guide (e.g., due to malformed feed format, content not meeting the requirements of the aggregator, etc.); (5) information on which RSS tags they can use and how to use them to improve the quality of the feed; (6) how often a podcast was played; (7) when was a podcast dropped (e.g., an audience downloaded 10 episodes but never watched them—the podcaster knew about the download, but not the actual usage); or (8) how long the average subscriber stays with the subscription—podcasters would like to know how "sticky" their show is. Does audience stay hooked or loyal to the subscription? Or does audience listen to a few episodes and then drop their subscription?

SUMMARY

Embodiments of the invention overcome the shortfalls of the current systems by creating an environment of providing a direct feedback for web syndication content to authors of web syndication. Aspects of the invention provide information of user usage or habits of the web syndication in one or more external devices that are coupled to a media player application. In addition, the users can conveniently provide feedback (e.g., usage statistics or usage habits) to the podcasters through a user-friendly input interface without having to generate tedious and burdening survey.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 1A is a block diagram illustrating a system of web syndication feedback environment according to an embodiment of the invention.

FIGS. 2A and 2B are exemplary screen shots of a graphical user interface (GUI) for providing feedback of web syndication content for a web syndication author according to an embodiment of the invention.

FIG. 3 is an exemplary form of web syndication feedback configuration settings according to an embodiment of the invention.

Corresponding reference characters indicate corresponding parts throughout the drawings.

DETAILED DESCRIPTION

Figure 1B:
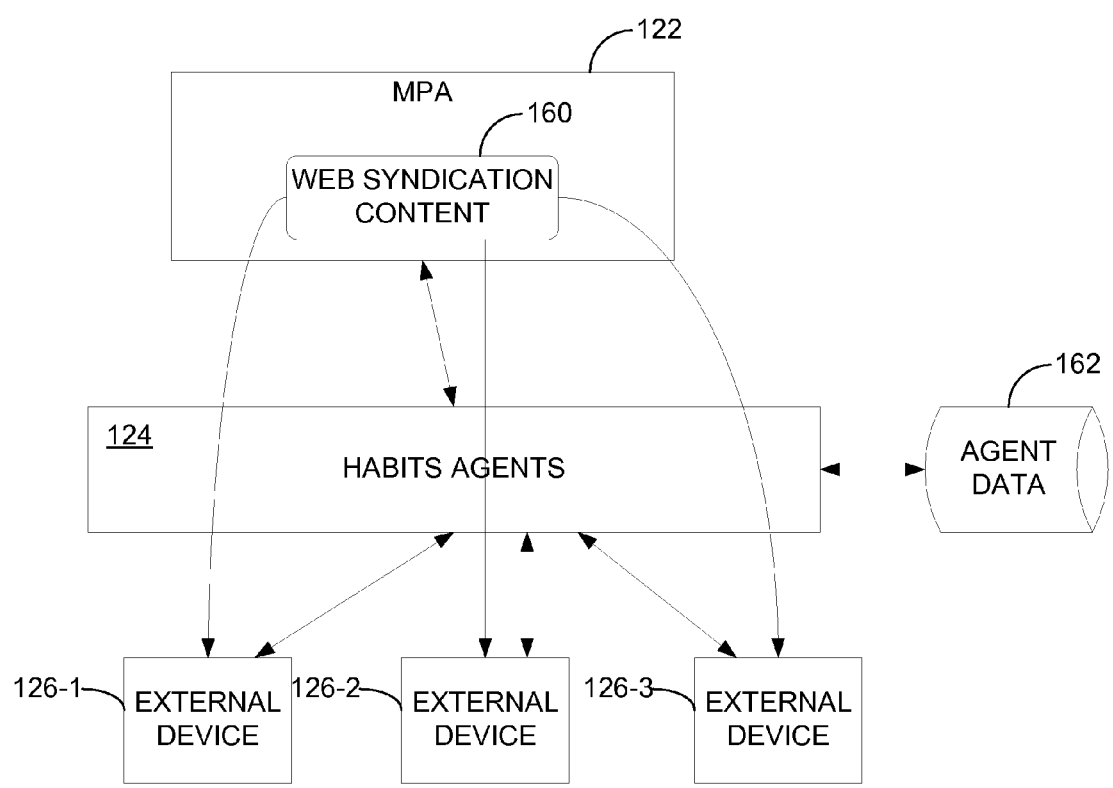
FIG. 1B is a block diagram illustrating operations of habits agents in gathering the usage information of a web syndication content according to an embodiment of the invention.

Referring first to FIG. 1, a diagram illustrates an exemplary embodiment of a system 100 of web syndication feedback environment according to an embodiment of the invention. The system 100 includes one or more server side devices (e.g., server computers), such as web services 102 as a front end server and one or more back end server components and services. For example, the web services 102 provide services such as web site content posting and user authentication and validation. For example, the system 100 may be a distributed network environment with a plurality of the server computing devices at the front end and backend side providing services (e.g., web services, application program distribution, data collection, and/or data aggregation) to a plurality of devices at the client side, such as the computing device 104.

The system 100 also includes one or more client side devices, such as a computing device 104. For example, the computing device 104 comprises a general purpose computing device having one or more processors or processing units 106 and an internal memory area 108. As known to those skilled in the art, the general purpose computing device may further include a system bus coupled to additional system components, such as peripheral component interfaces, and at least some form of computer readable media, which include both volatile and nonvolatile media, removable and non-removable media.

For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the general purpose computer (e.g., computing device 104). Also, the system 100 may include communication media, which typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

In one example, the system 100 may be a distributed computing network providing feedback for web syndication authors (hereinafter "podcasters"). In another example, the system 100 may be part of a web service provider of web syndication services. In yet another embodiment, the system 100 and its various server side components are operated in conjunction with a media player program such as media player 110 installed in the computing device 104, to create a uniform user experience of media content playback.

Initially, a podcaster 110 decides to make his or her personal recording (e.g., media content) available to other online users. For example, suppose a podcaster is interested in making a video of his monthly trip to Europe available for download by posting a link of the video clip in a particular format (e.g., branches of the really simple syndication (RSS) syndication protocol, Atom protocol, or the like) available on an online feed aggregator. An online feed aggregator typically provides a source of a collection of feed links, usually organized by various categories. In this example, the podcaster 110 may first locate a web site/service that has agreed to provide podcasting links or information of the media content to potential audience.

In another embodiment, a plurality of Internet grovel agents 112 collects one or more feed links in the form of RSS, Atom, or other web syndication protocols from one or more feed sites 114. In this example, the feed sites 114 may be web sites that permit user submissions. Other web syndication gathering methods (e.g., through user submission 132) may be employed without departing from the scope of the invention. With the collected links to the web syndication content, a feed guide database (DB) 116 is established, and a feed guide catalog 118 is organized and presented to a user 120 at the client side of the system 100.

Still referring to FIG. 1, the feed guide catalog 118 is transmitted to the client side via the web services 102. In one example, the web services 102 may be part of a media service offering of a media player application 122 that is installed on a computing device 104 at the client side. For example, the media player application (MPA) 122 includes software, programs or components of a program that render media content, such as audio or video files, to the user 116. In one example, the MPA 122 requires a feed plug-in program 120 for reading the feed guide catalog 114 before the MPA 122 can render the media content of the web syndication. In another embodiment, the MPA 122 includes an application program interface (API) for interacting with a web syndication reader.

In one example, the MPA 122 may render one or more media files, which may include an image file, an audio file, a video file, an audio/video data stream, or the like. The media files or content may be in various known formats such as Moving Picture Experts Group audio layer-3 (MP3), CDA, wave format, midi format, Moving Picture Experts Group audio layer-4 (MP4), or other proprietary formats. In another embodiment, the MPA 122 may be any suitable rendering program that is configured to play digital media so that a user can experience the content embodied on the media either audibly or visually through a display or both. For example, a suitable MPA 122 includes a CD media player application, a digitally-compressed-file player application, a DVD media player application, an image rendering application, and/or a motion picture file rendering application. Executing MPA 122 in the illustrated embodiment enables the user 116 to access one or more digital media files at the feed guide DB 116.

In one embodiment, the computing device 104 may be a portable media player (such as a MP3 player), a cellular phone, a smartphone, a personal digital assistant (PDA), and/or other digital media rendering device. In another embodiment, the MPA 122 also provides components or modules for rendering hypertext files, such as a web page, with links identifying content located locally or remotely from the computing device 104.

In one embodiment, the MPA 122 establishes a communication link with the web services 102 upon receiving a notification that web syndication content is available. The MPA 122 receives the web syndication content from the web services 102 and stores the content in the memory area 108 of the computing device 104. Upon storing the content, the MPA 122 terminates or closes the communication link with the web services. In one embodiment, an API communicates with the web services for receiving the web syndication content from the web services 102 based on a predetermined time period or on an ad hoc basis.

Once the web syndication content is stored locally in the memory area 108 at the client side, the user 120 may be able to operate the MPA 122 for rendering the web syndication content. In one example, one or more habits agents 124 track or monitor the usage behavior of the user 120. For example, a habits agent 124 may track a frequency of usage of the web syndication content, while another habits agent 124 may monitor whether the user 120 finishes playing of the entire duration of the web syndication content every time the user 120 renders the web syndication content. In another embodiment, when the MPA 122 detects a presence of one or more external devices 126, the habits agents 124 also monitor or track the usage of the web syndication content on the external devices 126. The collected data or metadata is then stored in an agent data store 128 for later retrieval for the podcaster 110.

Referring now to FIG. 1B, a block diagram illustrates operations of habits agents 124 in gathering the usage information of a web syndication content according to an embodiment of the invention. In one embodiment, the habits agents 124 may be components of the MPA 122 for tracking and monitoring user behaviors in interacting with media content.

In yet another embodiment, the habits agents 124 may include API's to interact with or supplement any existing user behavior tracking components or code for tracking user usages of media content both in the computing device 104 and the external devices 126. For example, the habits agents 124 track user's frequencies of playing a particular media file, recording where does the user store the particular media file, identify the type of external or portable device where the user stores the particular media file; track the usage of the particular media file in the external or portable device. In another embodiment where the user transfers media files from the computing device 104 to multiple external devices 126, the habits agents 124 may assign unique identifiers or prompt the user to identify the external devices 126. For example, suppose the user has two external devices, one for work-out and the other one for travel, either in the car or on the plane. The habits agents 124 may separately track and monitor the work-out external device and travel external device.

In yet another embodiment, as a web syndication content 160 is registered (e.g., when the web syndication content 160 is downloaded) with the MPA 122, the habits agents 124 are activated to track and monitor the usages of the web syndication content 160. For example, the MPA 122 may assign a metadata tag to any web syndication content and the habits agents 124 may generate an entry for a web syndication content in an agent data store 162. In this metadata tag, other fields storing counters or metrics relating to information, such as web syndication identification, usage location, usage frequency, usage thoroughness, or the like of the user behavior of the web syndication content 160. In one example, the user 120 connects a device (e.g., an external device 126) including a copy of the web syndication content 160 to the MPA, and the usage data of the web syndication content 160, such as play count, play marker, incomplete plays, and skip count on the syndicated content is transmitted to the habits agent 124 associated with the MPA 122. In an alterative embodiment, the habits agent 124 is able to track the web syndication content 160 based on a unique identifier such that the habits agent 124 may identify the web syndication content 160 at various locations and track or monitor usage data of the habits agent 124 even though one or more copies of the web syndication content 160 are available.

Upon detecting a presence of external devices 126 and a subsequent transmission of the web syndication content 160 to an external device 126, the habits agent 124 update such information in the agent data store 162. For example, the habits agent 124 monitors how a user consumes their feeds or web syndications. Suppose the user 120 subscribes to a web syndication content, but the user 120 never listens to the feeds. This type of behavior may be deemed as "of less interest" to this user. In yet another example, a web syndication that was listened to once but it was ignored after that one-time playback before it is eventually removed. This type of habit or behavior may make the web syndication content "undesirable". In one embodiment, various habits or behaviors may be determined solely based on user's behavior, based on some pre-determined criteria, or both. For example, the "of less interest" feedback rating may be based on a mismatch of sorts with the user (e.g., lack of time if none are being listened to). On the other hand, the "undesirable" rating may be pre-determined.

In one embodiment, one or more of the following behaviors are tracked or monitored by the habits agent 124:
1) Global behavior
   a. List of subscriptions
   b. Total feed plackback time (on all user PCs and devices)

2) Per Feed behavior
   a. % playback time for this feed, against global total playback time for all feeds
   b. % of episodes played
   c. % of episodes deleted without playing
   d. % episodes synchronized with a PD device.
   e. % of episodes played before user ended the subscription
   f. Duration of the feed subscription The agent data store 162 may be a collection of all the above habits data in an aggregated form. For example, suppose 100,000 users rate a web syndication content from a podcaster. The entry point for "Concise vs. Verbose" may be an average at a 3.41 of 5 possible points. This data store 162 in and of itself is capable of representing the eventual report to be sent to the podcaster. In an alterative embodiment, only parts of the information collected in the agent data store 162 are provided to the podcaster. For example, suppose there are 1,000 keywords submitted by the users subscribing to the web syndication. Instead of transmitting all 1,000 keywords to the podcaster, only the top 5 keywords are provided.

While embodiments of the invention are described in an environment where web syndication content is first received by the computing device 104 before the external devices 126 receives it, alternative embodiments provide tracking and monitoring of web syndication content even if the content is first received by the external devices 126 before being transferred to the computing device 104. In other words, consumption of a feed does not have to occur on the computing device 104 for the MPA 118 to track the user usage. Much web syndication or feeds consumption typically occurs on portable/external devices, e.g. MP3 players. The MPA 118 includes the necessary infrastructure to synchronize web syndications the external device 126 for mobile playback, and for the external device 126 to report the user's rendering behavior back to the MPA 118 during the next synchronization operation. In another embodiment, the habits agent 124 stores web syndication content usage information on a periodic basis.

Referring now to FIGS. 2A and 2B, exemplary screen shots illustrate GUI used in collecting user behavior data with respect to interactions with the web syndication content according to an embodiment of the invention. For example, a feedback form 202 illustrates a number of feedback questions that request the user 120 to give a score in a given scale. The screen shot 202 also provides a section 216 to include basic identification information for the web syndication. For example, the section 216 may include a title of the web syndication content, a name of the podcaster, subscription information, date information, and episode information of the web syndication content. It is to be understood other data may be collected without departing from the scope of embodiments of the invention.

In FIG. 2B, a feedback form 204 further illustrates other types of information gathered or collected from the user 120. For example, instead of scale-type of questions, the user 120 may be presented with yes or no questions in a box 212. Alternatively, the user 120 may provide additional information, such as providing suggestive keywords in a box 214 for the podcaster to consider. Upon completing the feedback form 202 or 204, the user 120 may use a control or a button 206 to submit the feedback and/or comment to the podcaster now, a button 208 to submit the feedback to the podcaster later, or a cancel button 210. In a further example, at least one of the various types of feedbacks is provided to the podcaster:
1) Scale of Concise vs. Verbose;
2) Scale of Clearly articulated vs. Mumbling;
3) Scale of Fun vs. boring;

4) Scale of Edgy/Hip vs. mainstream;
5) Scale of Meaningful vs. Drivel;
6) Edit fields for: Keywords; Category correction;
7) Checkboxes of: Profane; Explicit; Lewd; etc;
8) Scale of: Download speed (Too Slow to Very fast);
9) Scale of: Audio Quality (Lame to Great); or
10) Scale of: Video Audio Quality (Lame to Great).

Figure 2C:
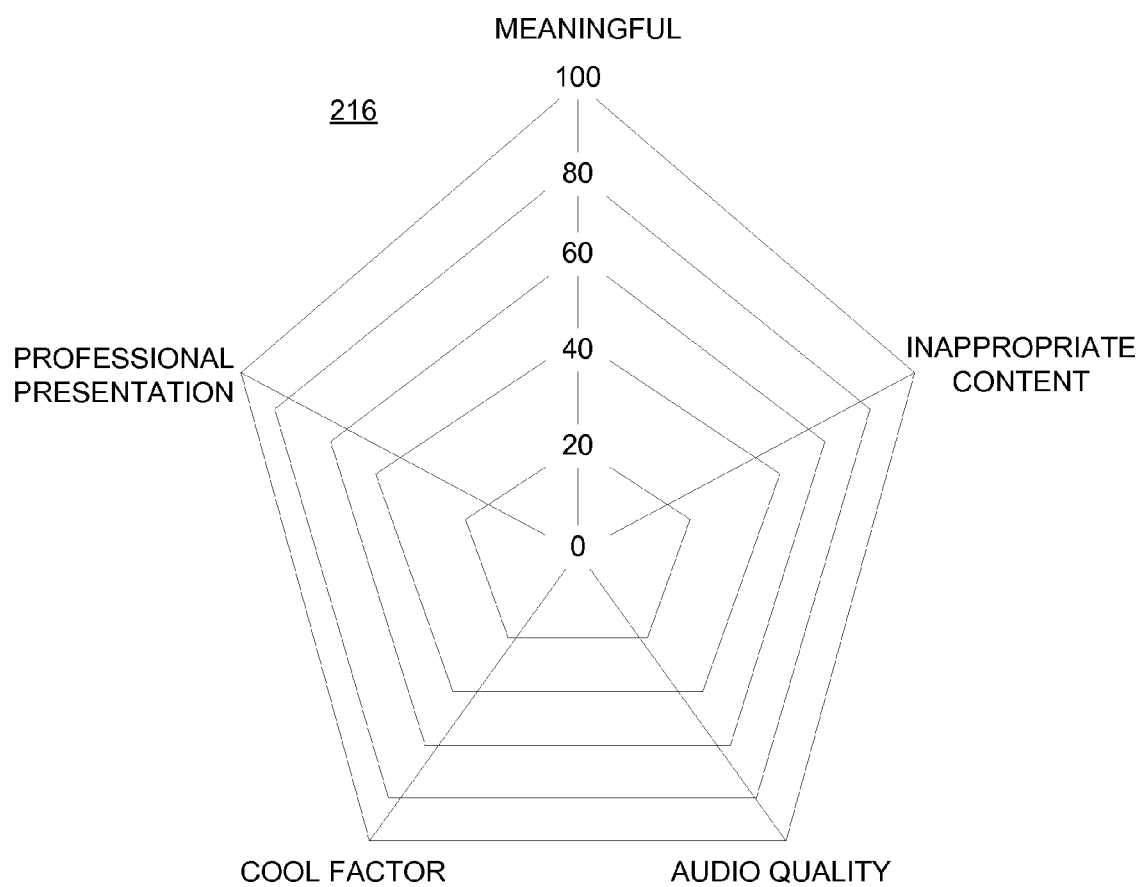
FIG. 2C illustrates a pentagon user-clickable polar chart for providing feedbacks to the podcaster according to an embodiment of the invention.

Embodiments of the invention enable a web syndication subscriber to provide input or "talk back" to the feed owner or podcaster. In an alternative embodiment, maximum web syndication usage data from a user is extracted from the user without scaring the user away. In yet another alternative embodiment, graphical input or feedback is provided to facilitate user feedback experience. FIG. 2C illustrates a pentagon user-clickable polar chart for providing feedbacks to the podcaster according to an embodiment of the invention. In this pentagon shaped user feedback chart, each of the 5 apexes represents 5 key metrics at the highest level. The user 120 may simply click on any of the axis to rate or provide feedback to the podcaster. In an alternative embodiment, areas of the pentagon feedback chart 216 may be shaded to indicate feedbacks from an individual (e.g., the user 120) or from a group (e.g., current subscribers).

FIG. 3 illustrates an exemplary screen shot showing web syndication feedback settings according to an embodiment of the invention. For example, a dialog window 302 presents one or more choices as to when the feedback is to be transmitted to the podcaster 110. Once the desire setting choices are selected, the user 120 may select a "Save" button 304 to save the settings for subsequent uses, or a "Cancel" button 306 to ignore the selections.

Once the feedback is collected from the user 120, the MPA 122 transmits the feedback to a feedback aggregation database 130. In one example, the feedback aggregation database 130 includes one or more existing known techniques for aggregating user feedbacks for a particular web syndication. For example, the feedback aggregation database 130 is capable of aggregating all feedback targeted for one particular podcaster for one particular episode of the web syndication. The aggregated feedbacks may next be sent to a robot editorial engine 134 for preparing the collected feedbacks in a proper or desirable format for the podcaster 110. For example, suppose the podcaster would like to receive feedback once a week, not once every 2 weeks. The robot editorial engine 134 may disseminate the collected feedback in such fashion.

Once the robot editorial engine 134 performs the necessary formatting work, the feedback from the user 120 is provided to the podcaster 110 either via a talkback web service 136 or via an email 138. For example, each web syndication content is associated with an author/owner and has an email tag. This associated email address is used to periodically email the podcaster 110 a report or invite the podcaster 110 to visit an authenticated web page to view reports.

In an alternative embodiment, the system 100 may be part of an authentication environment that provides a number of web services, such as hosting a web site, providing a blog space, and a web syndication. In order to use these services, a user is required to establish an account. Under this authentication environment, the user may need to log-in before posting a web syndication. Embodiments of the invention seamlessly incorporate into or integrate with such authentication environment by providing a report of web syndication feedback to the user when the user logs into his or her account. As such, not only does the user have frequent accesses to the feedbacks, but the user also has control over the amount of feedbacks he or she would like to receive to improve the web syndication content. Moreover, unlike existing practices where there is no organized feedback loop, embodiments of the invention generate a systematic framework for collecting, and aggregating feedback or comments to the content of web syndication to the podcaster.

Figure 4:
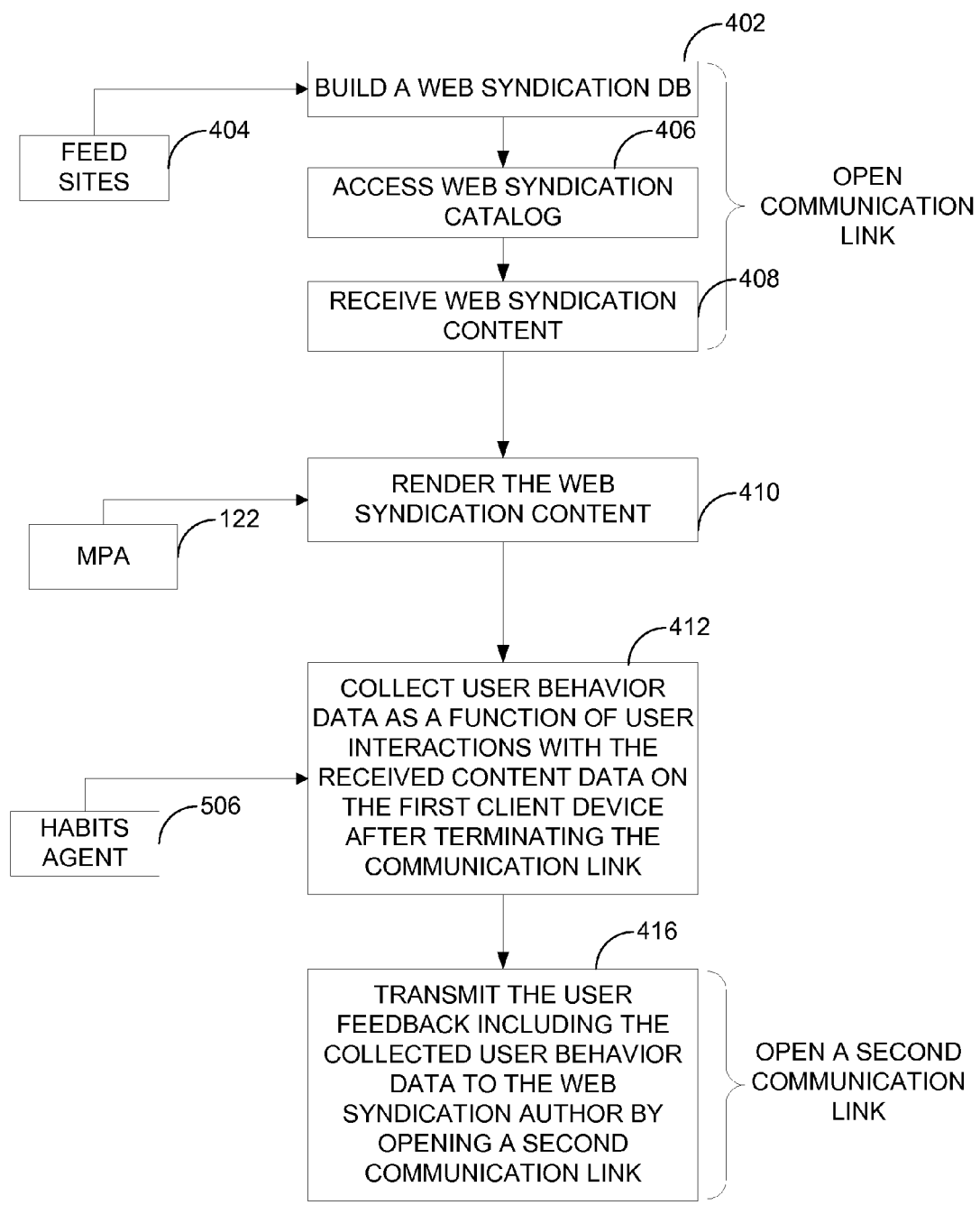
FIG. 4 is an exemplary flow chart illustrating operation of providing feedback to a web syndication author according to an embodiment of the invention.
Figure 5:
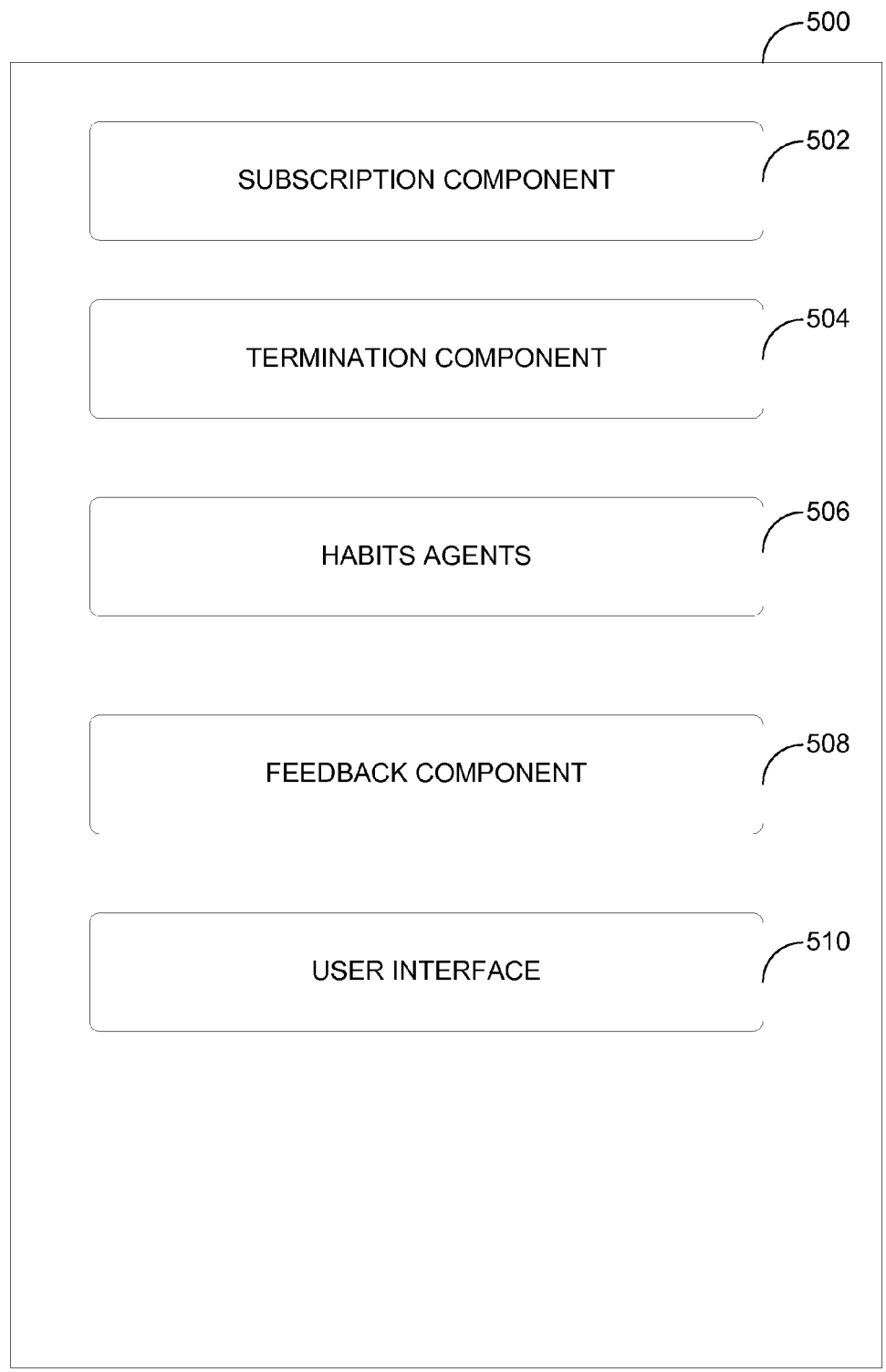
FIG. 5 is a block diagram illustrating an exemplary computer-readable medium on which aspects of the invention may be stored.

FIG. 4 is an exemplary flow chart illustrating operation of providing feedback to a web syndication author according to an embodiment of the invention. For example, methods described in FIG. 4 may be performed by computer-executable instructions stored in one or more computer-readable media, such as a computer-readable medium 500 shown in FIG. 5. For example, initially, a web syndication database is organized at 402 on the server side of the system 100. For example, feed or web syndication sites 404 are submitted manually or are collected automatically to build the web syndication database. In one example, collections in the database may be organized in categories in a web syndication catalog. At 406, a user accesses the web syndication catalog to select one or more desirable web syndication content. At 408, the user receives the web syndication content at the client side.

In one embodiment, a subscription component 502 of the computer-readable medium 500 opens a first communication link to receive content data from the podcaster. The received content data is next stored on a first client device (e.g., computing device 104). In another embodiment, a termination component 504 terminates the opened communication link after the web syndication content is received at the first client device. The MPA 122 renders the web syndication content at 410. At 412, one or more habits agents 506 collect user behavior data as a function of user interactions with the received content data on the first client device after terminating the communication link. At 414, a feedback component 508 transmits the user feedback including the collected user behavior data to the web syndication author by opening a second communication link. In one embodiment, the subscription component 502 opens a second communication link before the feedback component 508 transmits the user feedback to the podcaster. In an alternative embodiment, a user interface (UT) 510 receives additional user feedback for the podcaster.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having"

are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for transmitting user feedback from a user to a web syndication author, said method comprising:
    opening, by a media player of a first client device of the user, a first communication link to a web service in response to a notification of availability of content data from the web syndication author;
    receiving, at the first client device, via the opened first communication link, content data from the web syndication author, said content data comprising a podcast in a web syndication format, said web syndication format including one branch of really simple syndication (RSS) format, said received content data being stored on the first client device;
    terminating the opened first communication link after receiving the content data at the first client device;
    assigning, by the media player, a metadata tag to the received content data for storing user behavior data;
    assigning, by the media player, a unique identifier to the received content data;
    transferring of a copy of the received content data from the first client device to one or more external client devices, said transferred content data having the same unique identifier as the received content data;
    after terminating the first communication link, rendering, via the media player, at least some of the received content data to the user, wherein the media player executes a feed plug-in to enable said rendering;
    monitoring, via the media player at the first client device, user interactions with the received content data;
    collecting, at the first client device, the monitored user behavior data as a function of the user interactions with the received content data on the first client device after terminating the first communication link, said collecting further comprising collecting, by the media player on the first client device, upon transferring of the copy of the received content data of the first client device with the one or more external client devices, user behavior data based on user interactions with the transferred content data on the external client devices and based on the unique identifier associated with the received content data and the transferred content data;
    storing the collected user behavior data in the assigned metadata tag, and further storing the assigned metadata tag in an agent data store of the first client device;
    in response to the collected user behavior data, presenting a feedback form to the user at the first client device, said feedback form including interactive questions requesting feedback input data from the user regarding a user experience based on the user interactions with the received content data after terminating the first communication link; and
    in response to a user interaction from the user to transmit the feedback form, transmitting the requested feedback input data including the collected user behavior data in the agent data store from the first client device to the web syndication author by opening a second communication link.

2. The method of claim 1, wherein receiving the content data comprises receiving the content data from the web syndication author via the podcast in an atom syndication format.

3. The method of claim 1, further comprising providing to the user a user interface (UI) for providing additional user feedback to the web syndication author, and wherein transmitting comprises transmitting the additional user feedback to the web syndication author.

4. The method of claim 1, further comprising classifying the collected user behavior data based at least one of the following categories: information relating content data usage, information relating to quality of the web syndication content, information relating to content data transmission from the web syndication author to the user, and information relating to content data quality.

5. The method of claim 1, further comprising formatting the collected user behavior data based on the classified categories on the client device, and
    wherein transmitting comprises transmitting the collected user behavior data with the classified categories.

6. The method of claim 1, wherein transmitting the user feedback to the web syndication author occurs according to a pre-determined time period.

7. The method of claim 1, wherein one or more computer storage media have computer-executable instructions for performing the method of claim 1.

8. A system for transmitting user feedback from a user to a web syndication author, said system comprising:
    an interface of a media player for establishing a first communication link with a web service in response to a notification of availability of content data from the web syndication author;
    a processor configured for executing computer-executable instructions for:
        receiving, at a client device, via the opened first communication link content data from the web syndication author said received content data being stored on the client device;
        terminating the opened first communication link after receiving the content data at the client device;
        assigning, by the media player, a unique identifier to the received content data;
        transferring of a copy of the received content data from the first client device to one or more external client devices, said transferred content data having the same unique identifier as the received content data;
        after terminating the first communication link, rendering, via the media player, at least some of the received content data to the user, wherein the media player executes a feed plug-in to enable said rendering;
        monitoring, via the media player at the first client device, user interactions with the received content data on the first client device;
        collecting the monitored user behavior data as a function of the user interactions with the received content data on the client device after terminating the first communication link, said collecting further comprising collecting, by the media player on the first client device, upon synchronization of the first client device with the one or more external devices, user behavior data based on user interactions with the transferred content data on the external client devices and based on the unique identifier associated with the received content data and the transferred content data;

in response to the collected user behavior data, providing a feedback form to the user for requesting feedback input data from the user regarding a user experience based on the collected user behavior data of the received content data after terminating the first communication link; and in response to a user interaction from the user to transmit the feedback form, transmitting the requested feedback input data including the collected user behavior data from the client device to the web syndication author by opening a second communication link.

9. The system of claim 8, wherein the processor is configured to receive the content data from the web syndication author via the podcast in an atom syndication format.

10. The system of claim 8, wherein the interface comprises a user interface (UI) for providing additional user feedback to the web syndication author, and wherein the processor is configured to transmitting the additional user feedback to the web syndication author.

11. The system of claim 8, wherein the processor is further configured to classify the collected user behavior data based at least one of the following categories: information relating content data usage, information relating to quality of the web syndication content, information relating to content data transmission from the web syndication author to the user, and information relating to content data quality.

12. The system of claim 8, wherein the processor classifies the at least one of the following categories using one or more of the following metrics: meaningful, professional presentation, inappropriate content, audio quality, and cool factor.

13. One or more computer storage memory having computer-executable components for transmitting user feedback from a user at a location of a first client device to a web syndication author, said computer-executable components comprising:

a subscription component for opening a first communication link between a media player of the first client device and a web service in response to a notification of availability of content data from the web syndication author, said communications component receives via the opened first communication link content data from the web syndication author, said content data comprising a podcast in a web syndication format, said web syndication format including one branch of really simple syndication (RSS) format, said received content data being stored on the first client device;

a termination component for terminating the opened first communication link after receiving the content data at the first client device;

one or more habits agents for monitoring at the first client device user interactions with the received content data via the media player upon rendering of the received content data by the media player on the first client device after terminating the first communication link, said one or more habits agents further collect the monitored user behavior data as a function of the user interactions with the received content data on the first client device after terminating the first communication link, wherein the one or more habits agents of the first client device further collect user behavior data based on user interactions with a transferred copy of the received content data on another client device and based on a unique identifier common to the received content data and the transferred copy of the received content data and upon synchronization of said another client device with the first client device;

in response to the collected user behavior data, a feedback component for providing a feedback form to the user at the first client device for requesting feedback input data from the user regarding a user experience based on the user interactions with the received content data after the termination component terminates the first communication link; and wherein the feedback component, in response to a user interaction from the user to transmit the feedback form, transmits the requested feedback input data including the collected user behavior data from the client device to the web syndication author by opening a second communication link.

14. The computer storage memory of claim 13, wherein the feedback component transmits the user feedback to the web syndication author according to a pre-determined time period.

15. The computer storage memory of claim 13, wherein the one or more habits agents monitor transferring of the content data from the first client device to another client device.

16. The computer storage memory of claim 13, wherein the subscription component receives the content data from the web syndication author via the podcast in an atom syndication format.

17. The computer storage memory of claim 13, further comprising a user interface (UI) for receiving additional user feedback for the web syndication author, and wherein the feedback component transmits the additional user feedback to the web syndication author.

* * * * *